United States Patent [19]

Shirey

[11] 4,043,353

[45] Aug. 23, 1977

[54] MANUALLY, PNEUMATICALLY, OR ELECTRICALLY OPERABLE DRAIN VALVE DEVICE

[75] Inventor: Frank W. Shirey, North Huntingdon Township, Westmoreland County, Pa.

[73] Assignee: Westinghouse Air Brake Company, Wilmerding, Pa.

[21] Appl. No.: 710,555

[22] Filed: Aug. 2, 1976

[51] Int. Cl.² .................... F16T 1/00; F16K 31/05
[52] U.S. Cl. .................... 137/204; 251/258; 251/229
[58] Field of Search .............. 137/204, 203; 251/258, 251/229, 263, 262

[56] References Cited

U.S. PATENT DOCUMENTS

| | | | |
|---|---|---|---|
| 3,004,549 | 10/1961 | Temple | 137/204 X |
| 3,067,762 | 12/1962 | Parsons | 137/203 |
| 3,575,199 | 4/1971 | Beattie | 137/203 X |

*Primary Examiner*—Alan Cohan
*Attorney, Agent, or Firm*—R. S. Visk; R. W. McIntire, Jr.

[57] ABSTRACT

An automatic drain valve device alternatively adaptable for use in compressor systems using either electrical or pneumatic controls for cutting out and cutting in the compressor, and being operable to provide a drain operation twice during each cycle of compressor operation, that is, once when the compressor is cut out and again when the compressor is cut in. A manually operable lever on the valve devices provides for manual operation of the drain valve device at will and independently of the pneumatic and electrical controls.

10 Claims, 2 Drawing Figures

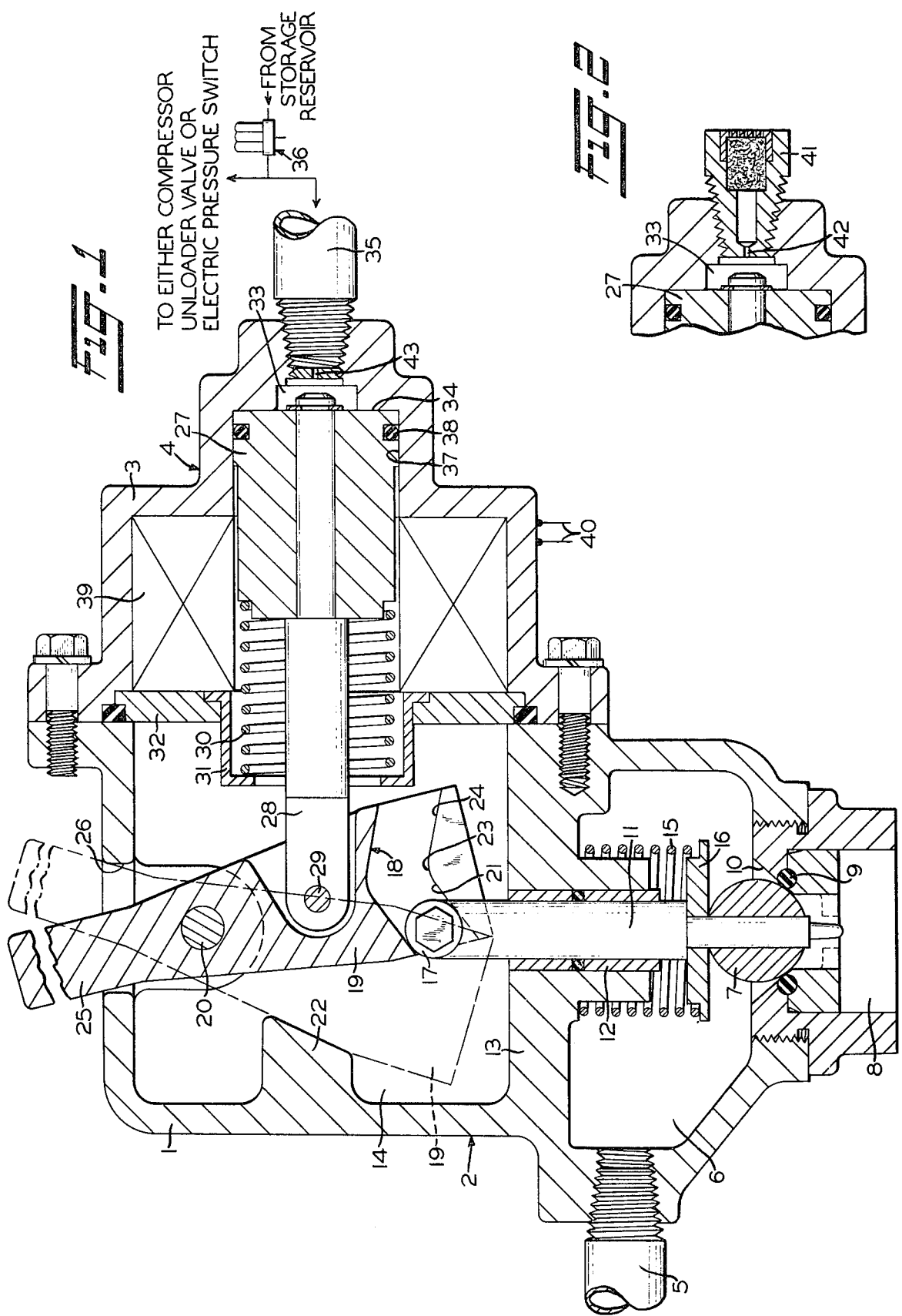

MANUALLY, PNEUMATICALLY, OR ELECTRICALLY OPERABLE DRAIN VALVE DEVICE

BACKGROUND OF THE INVENTION

As is known to those skilled in the art, air compressors are normally driven by such means as an electric motor or an internal combustion engine, depending upon which is more convenient to use. Normally, when the internal combustion engine is used as the driving means, an unloader valve device is actuated to a vent position by the governor to allow the compressor to pump compressed air to atmosphere, usually at an idling speed, when storage reservoir pressure has attained the high setting value of the governor, said unloader valve being restored to a closed position when the governor responds to reduction of reservoir pressure to the low setting value thereof for cutting in compressing action again.

If an electric motor is used as the driving means, the governor simply controls a pressure switch for deenergizing or energizing the motor as necessitated by the pressure condition of the storage reservoir.

In either of the cases above discussed, a drain valve device is normally installed in the system at a location where moisture condensate is most likely to accumulate, said drain valve being operable to a momentarily open position for allowing the accumulated moisture condensate to drain to atmosphere in response to either a pneumatic pressure control impulse or an electrical control impulse, depending upon the system, coinciding with the cutting-out phase of operation of the compressor. Normally, presently known drain valve devices are so constructed as to be operable either exclusively pneumatically or exclusively electrically. In the event, therefore, that the means for driving a compressor were changed from an internal combustion engine to an electrical motor, or vice versa, it may also be necessary to change the drain valve device to the appropriate type suited to the set-up.

SUMMARY OF THE INVENTION

The object of the present invention, therefore, is to provide a simplified compressed air system drain valve device alternatively operable electrically, pneumatically, or manually, and therefore adaptable for use in any such system, notwithstanding that either an internal combustion engine or an electric motor is employed as the driving means for the compressor.

Briefly, the novel drain valve device for draining moisture condensate from a compressed air system comprises a normally seated ball valve secured to one end of a valve stem, the other end of said valve stem having a cam follower engaging a cam surface formed on a pivotable fulcrum lever which, when pivoted about the fulcrum in either direction and due to the particular shape of the cam surface, causes the ball valve to be lifted off its seat momentarily to permit drainage of moisture condensate, then reseated. Pivoting movement of the fulcrum lever in one direction is effected by a rod having one end rotatably connected to said lever and the other end secured to an operating piston which may be actuated out of a normal position to move in said one direction either by a solenoid excited by an electrical control impulse or by a pneumatic pressure impulse acting on a pressure face thereof, said impulses coinciding with the cutting-out phase of compressor operation. Thus, the drain valve device may be used in a system wherein the compressor is driven either by an electric motor or by an internal combustion engine. Moreover, the fulcrum lever may be operated manually. A return spring acting on the piston serves to return the piston to its normal position upon termination of the control impulse coinciding with the cutting-in phase of compressor operation, thereby causing operation of the rod and the fulcrum in the other direction. Thus, the ball valve is unseated twice during each cycle of compressor operation.

BRIEF DESCRIPTION OF THE DRAWING

FIG. 1 of the drawing is an elevational view, in section, showing a drain valve device embodying the invention and as adapted for either electrical or manual operation.

FIG. 2 is a fragmentary portion, in section, of the drain valve device shown in FIG. 1 as adapted for pneumatic or manual operation.

DESCRIPTION AND OPERATION

As shown in FIG. 1, a drain valve device embodying the invention comprises a casing section 1 housing a valve portion 2 and a casing section 3 housing a piston portion 4. The drain valve device is normally connected in a compressed air system (not shown) in such a location as to permit moisture condensate to flow, via a pipe 5, into and accumulate in a valve chamber 6 formed in casing section 1. A valve member, such as a ball valve 7 for example, controls communication between valve chamber 6 and an atmospheric port 8, such communication being closed when said valve is in a closed or seated position relative to a valve seat 9 surrounding an opening 10 between said chamber and said port.

Ball valve 7 is fixed to one end of a valve stem 11 extending therefrom sealingly slidably through a bushing 12 secured in a separating wall 13 formed in casing section 1 separating valve chamber 6 from a lever chamber 14 into which said stem extends and terminates. Ball valve 7 is urged toward its seated position by a spring 15 compressed between separating wall 13 and a spring seat 16 carried by stem 11 and bearing on the ball valve.

The end of valve stem 11 disposed in lever chamber 14 carries a roller type cam follower 17 which rides transversely in an inverted V-shaped cam groove 18 formed at one end of a cam lever 19. Cam lever 19 is pivotally supported in casing section 1 by a pin 20 at a pivot point on said lever axially spaced from cam groove 18.

Thus, when cam lever 19 is pivoted clockwise, as viewed in the drawing, from a first angular position, in which it is shown and in which follower 17 occupies a low position in a left leg 21 of cam groove 18, to a second angular position, as shown in broken outline and limited by abutting contact of the lever with a stop 22 formed in the casing, said follower rides up said left leg, up over a high point 23, and then down a right leg 24 of the cam groove. This camming action, translated through valve stem 11, causes ball valve 7 to be momentarily lifted to an unseated or open position relative to valve seat 9 (as follower 17 rides up over high point 23) and then to be reseated again as said follower rides down to a low position in right leg 24. Thus, moisture condensate is expelled from chamber 6 via port 8 by air pressure in said chamber when valve 7 is unseated from valve seat 9.

Cam lever 19 has an axially extended portion 25 extending out of casing section 1 through an opening 26 formed therein so that pivoting of said lever, and therefore camming action, may be effected manually, if necessary. Normally, however, cam lever 19 is operated by a piston 27 reciprocably operable in casing section 3 perpendicularly to cam lever 19. Piston 27 has one end of a piston rod 28 coaxially secured thereto, the other end of said rod being pivotally connected to cam lever 19 by a pin 29 located between pin 20 and cam groove 18. A return spring 30 compressed between piston 27 and a spring seat 31 anchored in a separating wall 32 between casing sections 1 and 3, urges said piston toward a normal position in which cam lever 19 is operated to its first angular position, above defined and in which it is shown.

For operating cam lever 19 to its second angular position, piston 27 may be powered either pneumatically or electrically.

If piston 27 is powered pneumatically, a pressure chamber 33 formed cooperatively by casing section 3 and a pressure face 34 at the end of the piston opposite return spring 30, may be connected via a pipe 35 to a governor device 36. When governor device 36, in well known manner and in response to pressure in a compressed air storage reservoir (not shown) at a degree corresponding to the high pressure setting of the governor, supplies such pressure to a compressor unloader valve (not shown) for cutting out the compressor, such pressure is also supplied concurrently to pressure chamber 33 for causing leftward movement, as viewed in the drawing, of piston 27 to a displaced position and consequently operation of cam lever 19 to its second angular position. The resulting camming action and the consequent momentary opening of ball valve 7 causes moisture condensate accumulated in chamber 6 to be expelled to atmosphere, as hereinbefore described.

Piston 27 and cam lever 19 remain in their respective displaced and second angular positions until governor device 36, in response to pressure in the storage reservoir at a degree corresponding to the low pressure setting, operates to relieve actuating pressure from the unloader valve for restoring compressor action and concurrently relieve pressure from chamber 33 of the drain valve device. Whereupon, return spring 30 restores piston 27 to its normal position and cam lever 19 to its first angular position, and in so doing causes momentary opening of ball valve 7 again by the transpiring camming action. Thus, draining of moisture condensate from chamber 6 occurs twice during the full cycle of operation of governor device 36, that is, coincidentally with unloading and loading of the compressor, respectively.

Since pin 29 and the end of rod 28 connected thereto must travel on an arcuate path on a radius between the centers of pins 20 and 29, axial movement of said rod, by necessity, accordingly deviates from a straight axial path of travel. Such deviation, which is also reflected in the axial travel of piston 27, is accommodated by providing sufficient clearance between said piston and the adjacent wall of a bore 37 in which the piston operates. The clearance thus permits piston 27, within limits, to pivot about the end thereof opposite rod 28, so that a sealing ring 38 surrounding said end of the piston in sealing relation to said bore acts as a fulcrum for such pivotal action of the piston.

If the drain valve device above described is employed in a system having an electric motor (not shown) for driving the compressor, a solenoid 39 may be employed which, when energized, effects movement of piston 27 from its normal position to its displaced position, and vice versa when the solenoid is deenergized. Solenoid 39 is connected by an electrical circuit 40 in parallel to a pressure switch (not shown) which is controlled, in well known manner, by the governor device for shutting down and restarting the compressor driving motor in coincidence with high and low pressure levels in the storage reservoir. Solenoid 39 is alternately energized and deenergized accordingly for effecting camming and valve action in a manner similar to that described above in connection with pneumatic operation of piston 27.

When piston 27 is operated electrically, pipe 35 may be disconnected and a wasp excluder type plug 41 may be substituted therefor.

Dash pot action of piston 27 and, therefore, the length of time required for the piston to move from one of its positions to the other, so that the length of time that ball valve 7 remains open, may be controlled by the dimension of a choke 42 formed in plug 41, when solenoid 39 is the actuating means, or a choke 43 inserted between pipe 35 and chamber 33, when pneumatic pressure is the actuating means.

Having now described the invention, what I claim as new and desire to secure by Letters Patent, is:

1. A drain valve device for collecting and expelling moisture condensate from a compressed air system, said drain valve device comprising:
    a. a casing having formed therein a valve chamber connectable to the compressed air system for collecting moisture condensate therefrom;
    b. valve means in said chamber normally occupying a seated disposition in which the chamber is closed to atmosphere, and being operable to an unseated disposition for opening the chamber and expelling the moisture condensate therein to atmosphere;
    c. cam means connected to said valve means and alternately movable in opposite directions for operating said valve means to its said unseated disposition each time said cam means moves in each of said opposite directions; and
    d. operating means normally biased toward a first position for moving said cam means in one of said opposite directions, and effective, when actuated, for moving said cam means in the other of said opposite directions.

2. A drain valve device, as set forth in claim 1, wherein movement of said cam means is limited in both said opposite directions.

3. A drain valve device, as set forth in claim 1, further characterized by electrical means and pneumatic means for alternatively effecting actuation of said operating means either electrically or pneumatically.

4. A drain valve device, as set forth in claim 3, further characterized by manual means for manually moving said cam means in said opposite directions.

5. A drain valve device, as set forth in claim 4, wherein said electrical means and said pneumatic means are cyclically operable.

6. A drain valve device, as set forth in claim 5, wherein said operating means comprises a piston and a piston rod operably connecting said piston to said cam means.

7. A drain valve device, as set forth in claim 6, wherein said electrical means comprises a solenoid and an electrical circuit.

8. A drain valve device, as set forth in claim 6, wherein said pneumatic means comprises:

a. a pressure area at one end of said piston subjectable to pneumatic pressure cyclically supplied to and released from a pressure chamber formed in said casing adjacent said pressure area; and b. a governor device operable responsively to high and low levels of pressure in the system for supplying pressure to and releasing pressure from said pressure chamber, respectively.

9. A drain valve device, as set forth in claim 6, wherein said cam means comprises:

a. a cam lever pivotally fulcrumed at one end;

b. an inverted V-shaped cam groove formed at the other end of said cam lever;

c. a valve stem having one end secured to said valve means in normal disposition relative to said cam groove and carrying a cam follower at the opposite end riding in the cam groove, d. said cam lever being connected to said piston rod at a point between the fulcrum and the cam groove.

10. A drain valve device, as set forth in claim 9, wherein said manual means comprises an extended portion of said cam lever extending out of said casing and accessible for manual operation.

* * * * *